US007171167B2

United States Patent
Lie et al.

(10) Patent No.: US 7,171,167 B2
(45) Date of Patent: Jan. 30, 2007

(54) MOBILE PHONE COMPANION APPARATUS TO PROVIDE VOICE LINK WITH LAND-LINE HOUSE TELEPHONE

(76) Inventors: Kun Ho Lie, 2430 W. Mulberry Dr., Chandler, AZ (US) 85248; Tahte Shih, 8202 Broken Branch, Round Rock, TX (US) 78681

( * ) Notice: Subject to any disclaimer, the term of this patent is extended or adjusted under 35 U.S.C. 154(b) by 167 days.

(21) Appl. No.: 10/669,410

(22) Filed: Sep. 25, 2003

(65) Prior Publication Data

US 2005/0070271 A1  Mar. 31, 2005

(51) Int. Cl.
*H04B 1/40* (2006.01)
*H04M 1/00* (2006.01)

(52) U.S. Cl. .................. 455/74.1; 455/554.1
(58) Field of Classification Search ............ 455/426.2, 455/74.1, 554.1; 379/413.02
See application file for complete search history.

(56) References Cited

U.S. PATENT DOCUMENTS

| 2,535,063 A * | 12/1950 | Halstead ................ 455/83 |
| 4,658,096 A | 4/1987 | West et al. |
| 4,959,851 A * | 9/1990 | Tobolski et al. .......... 455/74.1 |
| 5,517,565 A * | 5/1996 | Cotreau ................ 379/252 |
| 5,715,296 A | 2/1998 | Schornack et al. |
| 5,815,567 A * | 9/1998 | Davis et al. ............. 379/377 |
| 5,946,616 A | 8/1999 | Schornack et al. |
| 5,983,098 A * | 11/1999 | Gerszberg et al. ........ 455/426.1 |
| 6,704,580 B1 * | 3/2004 | Fintel ................ 455/550.1 |
| 6,778,824 B2 * | 8/2004 | Wonak et al. ............ 455/426.2 |
| 2002/0072390 A1 * | 6/2002 | Uchiyama ................ 455/557 |
| 2002/0151329 A1 * | 10/2002 | Prince et al. ............. 455/557 |
| 2002/0155819 A1 * | 10/2002 | Trombatore ............ 455/74.1 |
| 2002/0193107 A1 * | 12/2002 | Nascimento, Jr. ........ 455/426 |
| 2003/0017854 A1 * | 1/2003 | Avitan ................ 455/564 |
| 2004/0097198 A1 * | 5/2004 | Chen ................ 455/74.1 |
| 2004/0192338 A1 * | 9/2004 | Bacon et al. ............ 455/456.1 |
| 2004/0203481 A1 * | 10/2004 | Park et al. ............ 455/74.1 |
| 2004/0235518 A1 * | 11/2004 | Beyette et al. .......... 455/554.2 |
| 2005/0025308 A1 * | 2/2005 | Tischer et al. ......... 379/413.02 |
| 2006/0111151 A1 * | 5/2006 | Lie et al. ............. 455/565 |

* cited by examiner

*Primary Examiner*—William Trost
*Assistant Examiner*—Marivelisse Santiago-Cordero

(57) ABSTRACT

An apparatus that allows land-line house telephone users to receive mobile telephone incoming call through connection port, e.g., headphone outlet, commonly equipped on mobile telephone or like device. With the aid of this apparatus or called Personal Mobile Companion (PMC), incoming call onto a mobile telephone or like device can be answered on a land-line house telephone set. The apparatus houses several claimed circuitry components and provides needed electrical voltage and currents to activate ring tone on house telephone upon receiving ring signals from mobile telephone or like devices. Voice signal is transmitted between a receiver using land-line house telephone, onto PMC, and through mobile telephone to a caller.

2 Claims, 12 Drawing Sheets

MOBILE PHONE COMPANION APPARATUS TO PROVIDE VOICE LINK WITH LAND-LINE HOUSE TELEPHONE

CROSS-REFERENCE

US Patent Documents

U.S. Pat. No. 4,658,096 Apr. 14, 1987 West et al.

U.S. Pat. No. 5,715,296 Feb. 3, 1998 Schornack et al.

U.S. Pat. No. 5,946,616 Aug. 31, 1999 Schornack et al.

STATEMENT REGARDING FEDERALLY SPONSORED RESEARCH OR DEVELOPMENT

The claimed invention is not sponsored by federal research and development grant.

BACKGROUND AND PRIOR ART

Description of the Prior Art

Existing products, such as Phonecell SX4e FWT for GSM 1900 and Phonecell SX4D Desktop phone for TDMA 800 manufactured by TELULAR Corp. and described in U.S. Pat. No. 5,946,616 issued on Aug. 31, 1999 and U.S. Pat. No. 5,715,296 issued on Feb. 3, 1998, focus on decoupling RF circuit loop and land-line circuit loop on a fixed wireless telephone set. U.S. Pat. No. 4,658,096 issued to West et al. on Apr. 4, 1987 details an interface system for interfacing a telephone set with a RF transceiver as part of telephone network.

The fixed wireless telephone set requires build-in RF function in order to receive and transmit RF signal to communicate with mobile phone service provider's station. Therefore, the fixed wireless hardware requires frequent upgrade for mobile service providers' frequency band changes and wide range of fixed wireless telephone models are needed to work with wireless service providers' many mobile network systems, e.g., GSM, TDMA, and CDMA.

Users of fixed wireless telephone set are required to keep up with the costly hardware upgrade to replace outdated product in order to utilize newer services and better mobile phone quality provided by wireless service providers.

BRIEF SUMMARY OF THE INVENTION

The invention, called Personal Mobile Companion (PMC), presented is fully compatible with all mobile network standards and mobile handsets, using different frequency bands, provided by various wireless service providers. It will not be necessary to replace the PMC due to mobile phone upgrade because only mobile phone's analog voice signal is needed as input for PMC to carry out conversation between calling parties. The PMC provides a low cost mean to enable the use of house land-line telephone set to receive wireless signal and carry out phone conversation on land-line telephone set through individual's own mobile telephone, as shown in FIG. 1.

The PMC is composed of three major components, as shown in FIG. 2A, that include (A) a power supply unit which converts the regular household 110V AC power source to an 11V DC; (B) a voltage driver component that splits the 11V DC into an 8V DC to drive house land-line telephone headset components and a 11V DC for PMC ring tone circuit controller to control ring tone signal on household phone; and (C) a ring tone circuit controller which uses the ring tone signal from mobile phone headphone outlet to activate PMC Ring Tone Generator (RTG) in order to send out repeated AC signal to drive the ringer on land-line telephone set. The voltage driver splits an incoming DC voltage into two separate power sources, an 8V DC for land-line telephone handset and an 11V DC for ring tone circuit, as shown in FIG. 2B. The ring tone circuit controller, shown in FIG. 2C, includes a RTG unit (F) to create a 6 seconds voltage cycle for land-line telephone and an impedance variation detector (G) to detect resistance change, when house land-line telephone headset is picked up by receiving party, and shut off the AC current for ring tone.

The PMC unit delivers 8V DC along with the 12V AC generated by the ring tone circuit controller when incoming call to mobile phone was first detected and ring signal was automatically delivered from mobile phone through the headphone connection to PMC. Mobile phone unit is normally programmed to automatically answer incoming call, after preset ring cycles, when a headphone unit is plugged into the headphone outlet. The 12V AC will then activate the ringer on the land-line telephone unit to inform receiving party of the incoming call onto the connected mobile phone. While the 8V DC current is blocked by the ringer capacitor on the land-line telephone, the calling party will continue to hear ring signal feedback, generated by a ring tone generator (RTG) shown in FIG. 3D, before the receiving party picks up the land-line telephone headset. When the receiving party picks up the land-line telephone headset, the 8V DC current will then flow through the closed loop and activate the speech circuit on land-line telephone. The adding of speech circuit will thus change line resistance. The Impedance Variation Detector (IVD), shown in FIG. 3E, will cut off the 11V DC power supply, to the RTG unit after detecting the change in line resistance. Voice communication between calling and receiving parties are now connected by the 3V AC, from mobile headphone outlet, through A* and B* lines shown in FIG. 2C, alone with the 8V DC generated by PMC handset voltage driver.

At the end of conversation, the 8V DC is shut off after the receiving party put down headset unit to shut off hook switch. Mobile telephone will automatically end the incoming call upon pre-set silence time limit. And the PMC unit is now back to its ready state to receive another incoming call.

FIG. 2D shows the time sequence waveform chart of each major unit in the PMC box. These are waveforms generated by cell phone signal, ring tone connecting device 10 (shown in FIG. 3D), relay 18 (shown in FIG. 3D), clock generator 19 (also shown in FIG. 3D), IVD (G) (shown in FIG. 2C) and the ring tone signal driven by PMC.

External On/Off switches, 9 shown in FIGS. 3B and 13 shown in FIG. 3C, are also provided to cutoff the 8V DC power supply to a land-line telephone headset and to silence the ring tone.

DESCRIPTION OF THE INVENTION

The PMC unit is composed of several major functional circuit components to provide needed electrical current at desirable voltage to drive land-line telephone set in order to inform receiving party of incoming calls and to carry out conversation between calling and receiving parties. These functional circuit units are as follows.

Figure 3A:
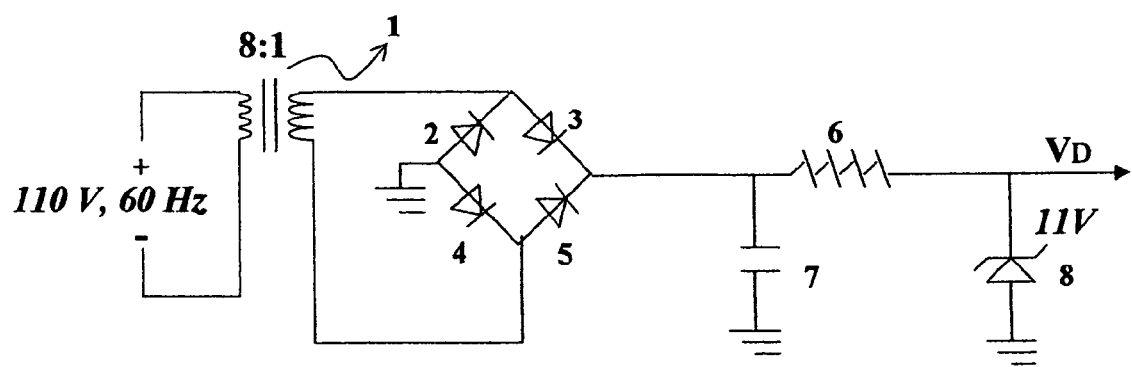
FIG. 3A Circuit diagram of the power supply unit (A) shown in FIG. 2A.

Power Supply Unit; FIG. 3A

Figure 1:
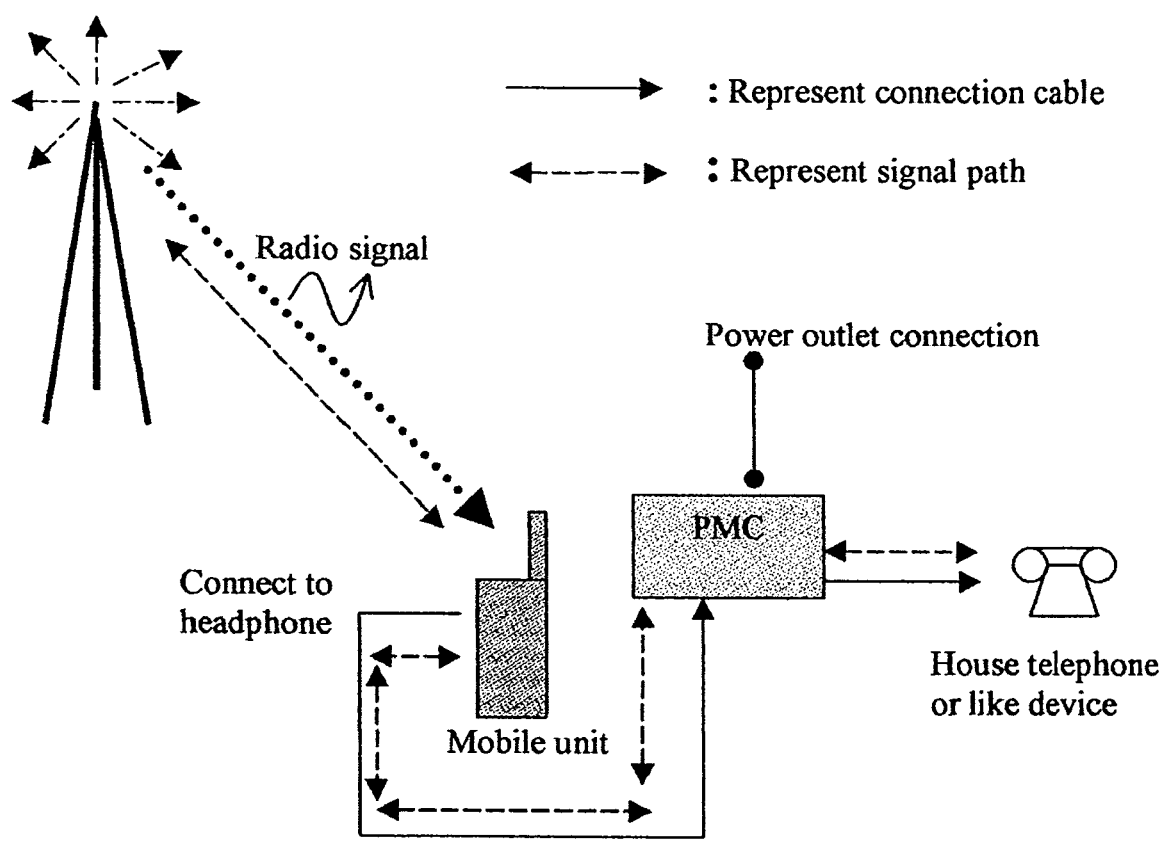
FIG. 1 Schematic diagram showing how signal is transferred from wireless service provider's mobile tower to handheld mobile telephone, through the claimed apparatus PMC to house telephone set, or like device.
Figure 2A:
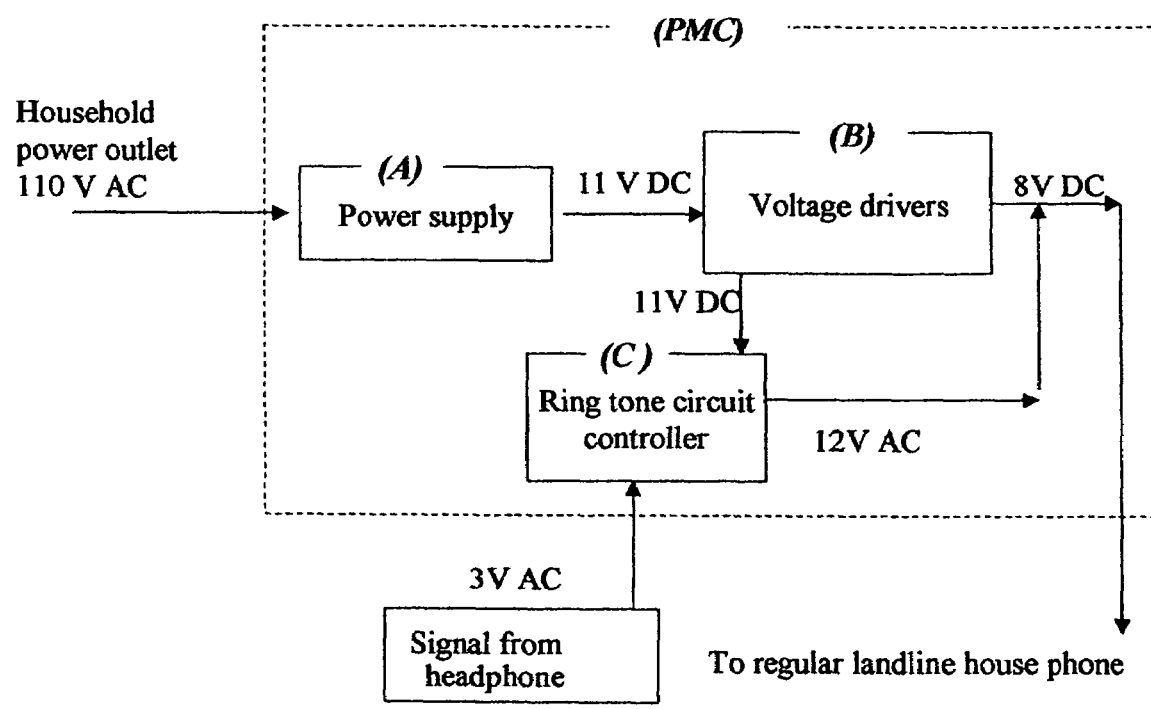
FIG. 2A Schematic of voice signal processing functional block inside the PMC, the diagram shows how PMC connects to mobile telephone headphone and to regular land-line house telephone with power input from house wiring power outlet.
Figure 2B:
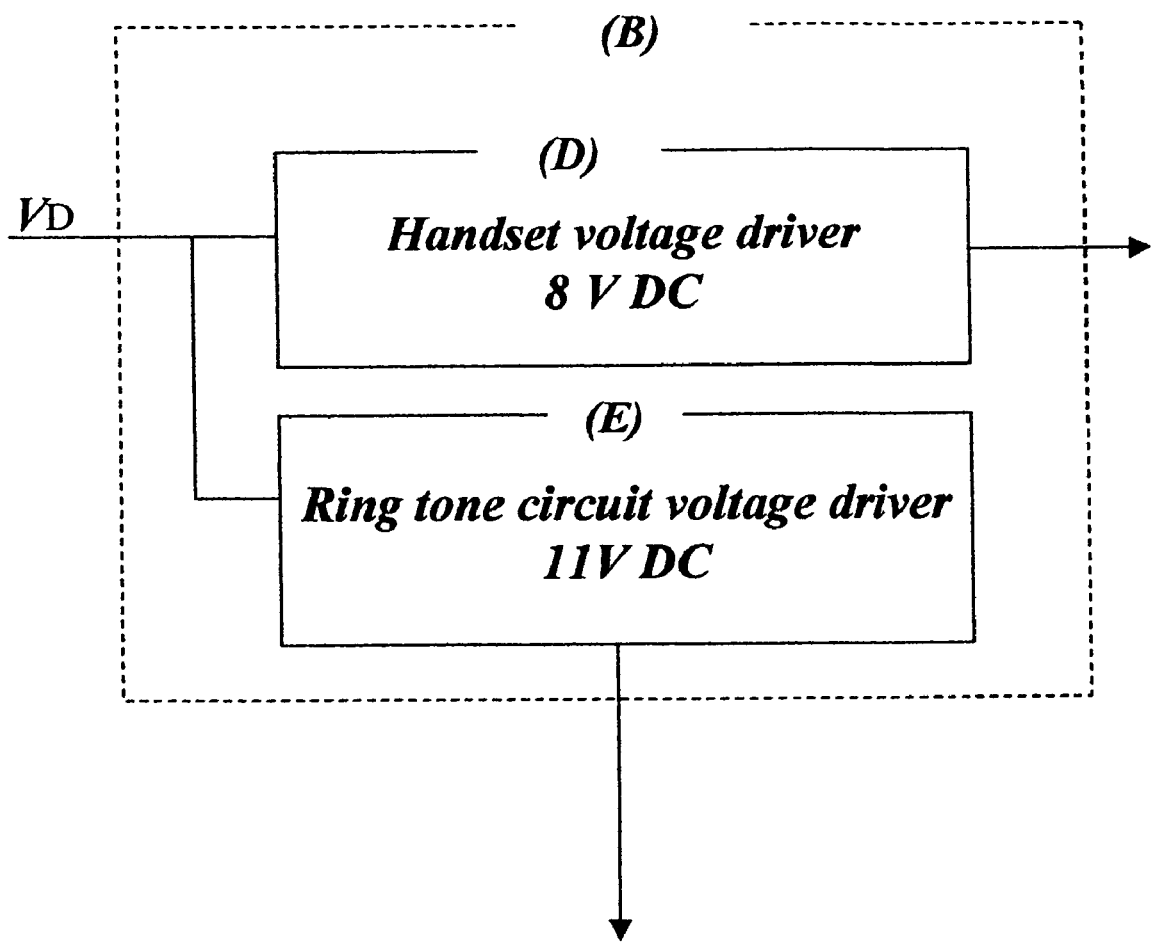
FIG. 2B Schematic diagram showing the voltage driver unit (B) as shown in FIG. 2A.

Function of this unit is to convert 110V AC from wall outlet to 11V DC and provide stable DC source to power "Voltage driver" and "Ring tone circuit voltage driver" modules, shown as (D) and (E) in FIG. 2B. The unit is composed of an 8:1 transformer 1, a bridge rectifier 2–5, a capacitor filter 7, a surge resistor 6 and an 11V Zener diode 8. An 8:1 transformer 1 transforms the 110V AC to 24.74V AC, as the $2^{nd}$ peak voltage. The $2^{nd}$ peak voltage then passes through the full wave bridge rectifier 2–5, results in an output voltage of 14.86V AC. Capacitor filter 7 acts as ripple remover with capacitance ranging from several hundreds to thousand uF. Resistance 6 is the current limiting resistor for surge current reduction. An 11V Zener diode 8 is attached before the power supply output end to ensure stable DC voltage output VD, as shown in FIG. 2B.

Figure 3B:
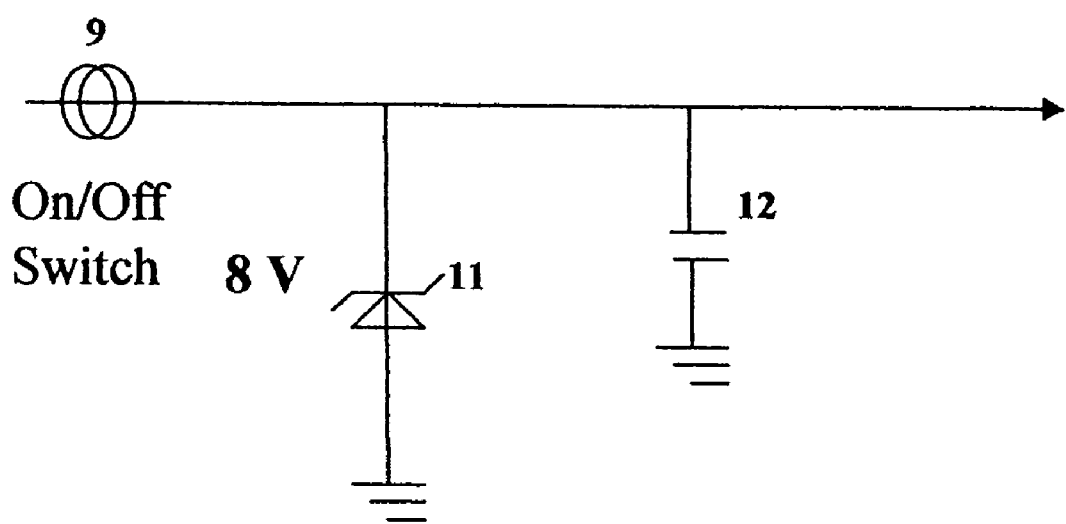
FIG. 3B Circuit diagram of the handset voltage driver unit (D) shown in FIG. 2B.

8V Voltage Driver; FIG. 3B

Function of this module is to supply DC voltage needed to drive the speech circuit of the land-line telephone handset circuit. The power driver is composed of a Zener diode 11 and one capacitor 12, see FIG. 3B. Zener diode 11 of this circuit acts as an 8V voltage regulator and capacitor 12 is to remove any residual AC noise. An external On/Off switch 9 is provided to turn on or off the voltage driver unit.

Figure 3C:
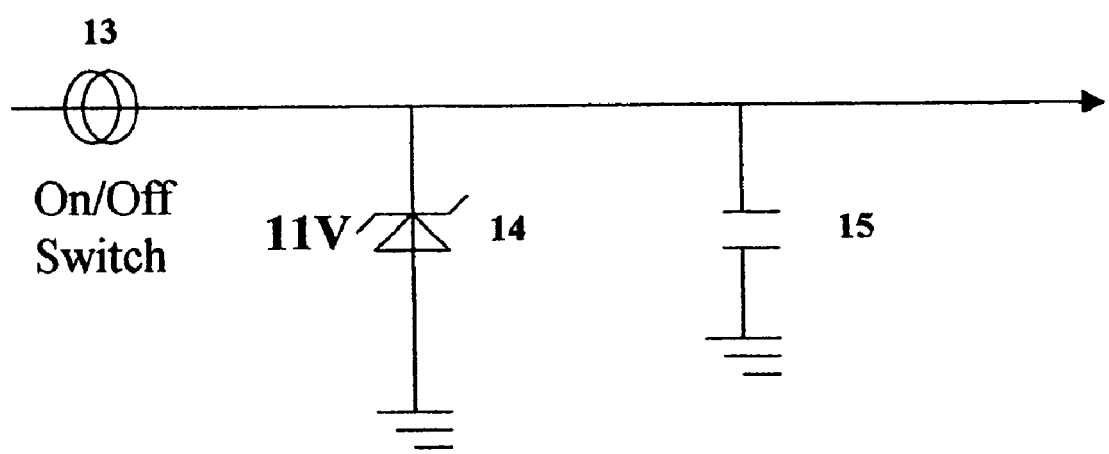
FIG. 3C Circuit diagram of the PMC ring tone circuit controller voltage driver unit (E) shown in FIG. 2B.

11V Voltage Driver; FIG. 3C

Function of this module is to supply DC voltage needed to drive the ringer of land-line telephone handset circuit. Also, it acts as the power supply for two key modules in the PMC box, they are the Impedance Variation Detector (IVD) and the Ring Tone Generator (RTG). The driver is composed of one Zener diode 14 and one capacitor 15, see FIG. 3C. Zener diode acts as voltage stabilizer and capacitor 15 is to remove any residual AC noise. On/Off switch 13 is an external switching unit to turn on or off the voltage driver unit.

Figure 3D:
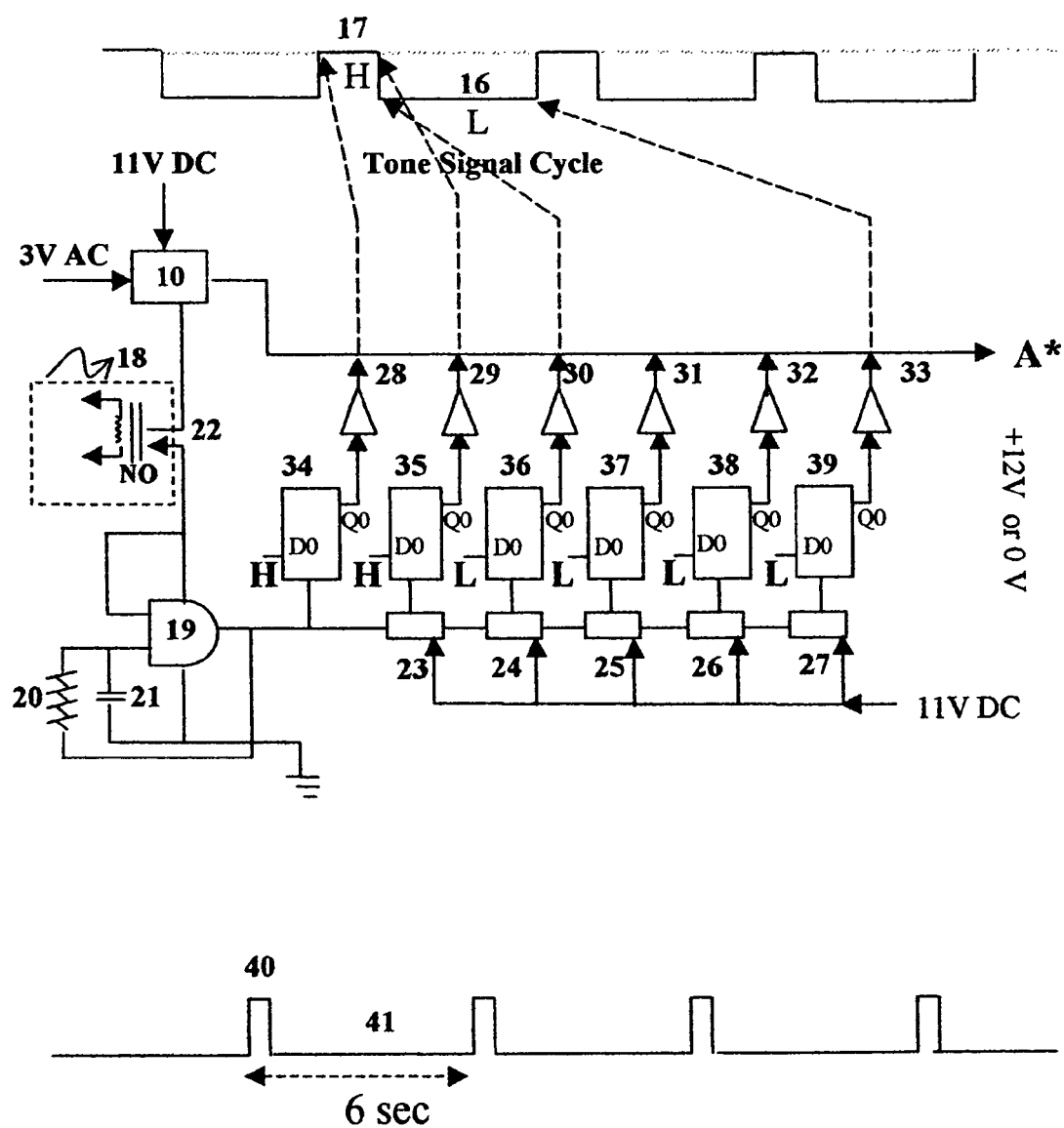
FIG. 3D Circuit diagram of the PMC Ring Tone Generator (RTG), shown as unit (F) in FIG. 2C.

Ring Tone Generator; FIG. 3D

Figure 2D:
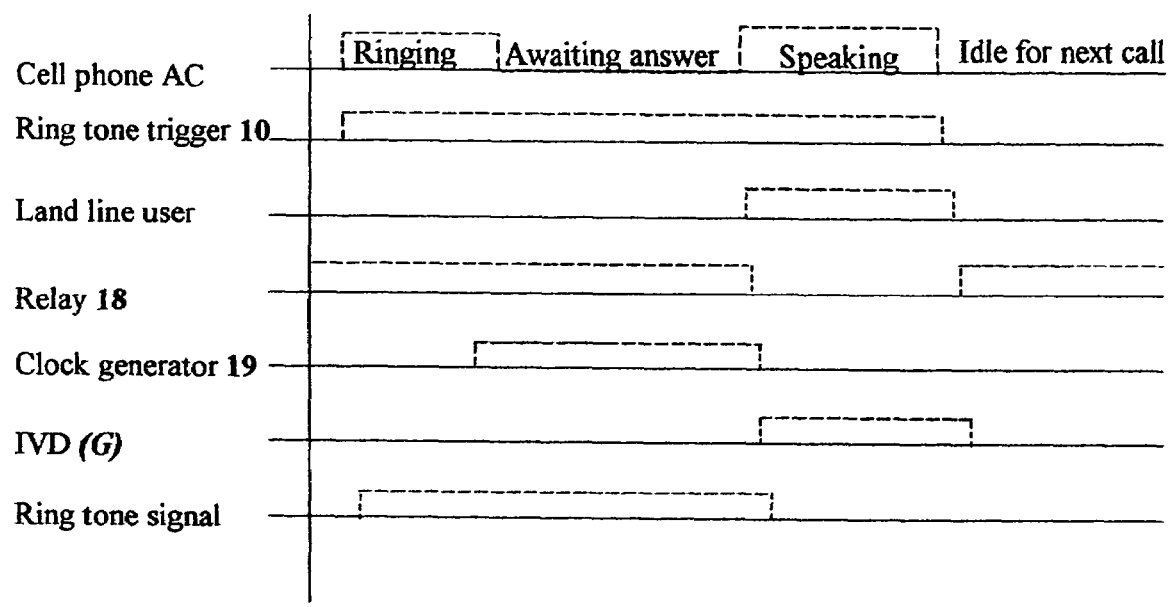
FIG. 2D Time sequence waveform chart of major units in the PMC box and their response to land-line user.
Figure 3E:
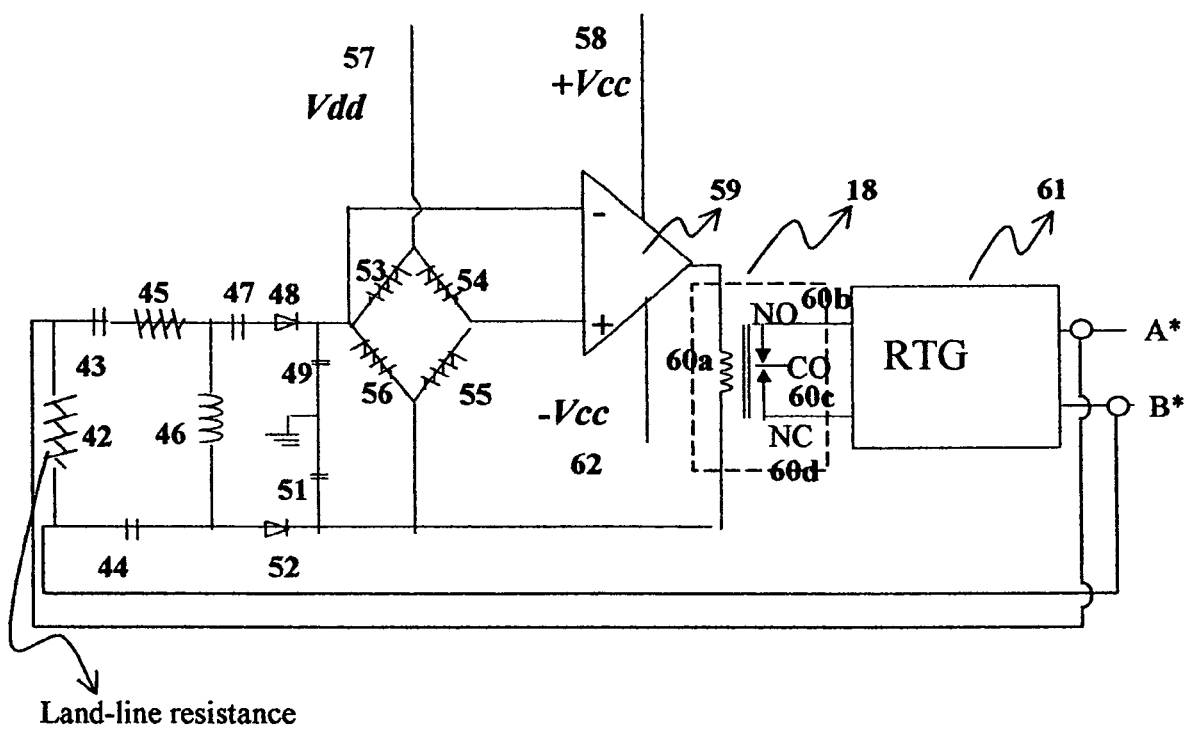
FIG. 3E Circuit diagram of the Impedance Variance Detector (IVD) shown as unit (G) in FIG. 2C.
Figure 3F:
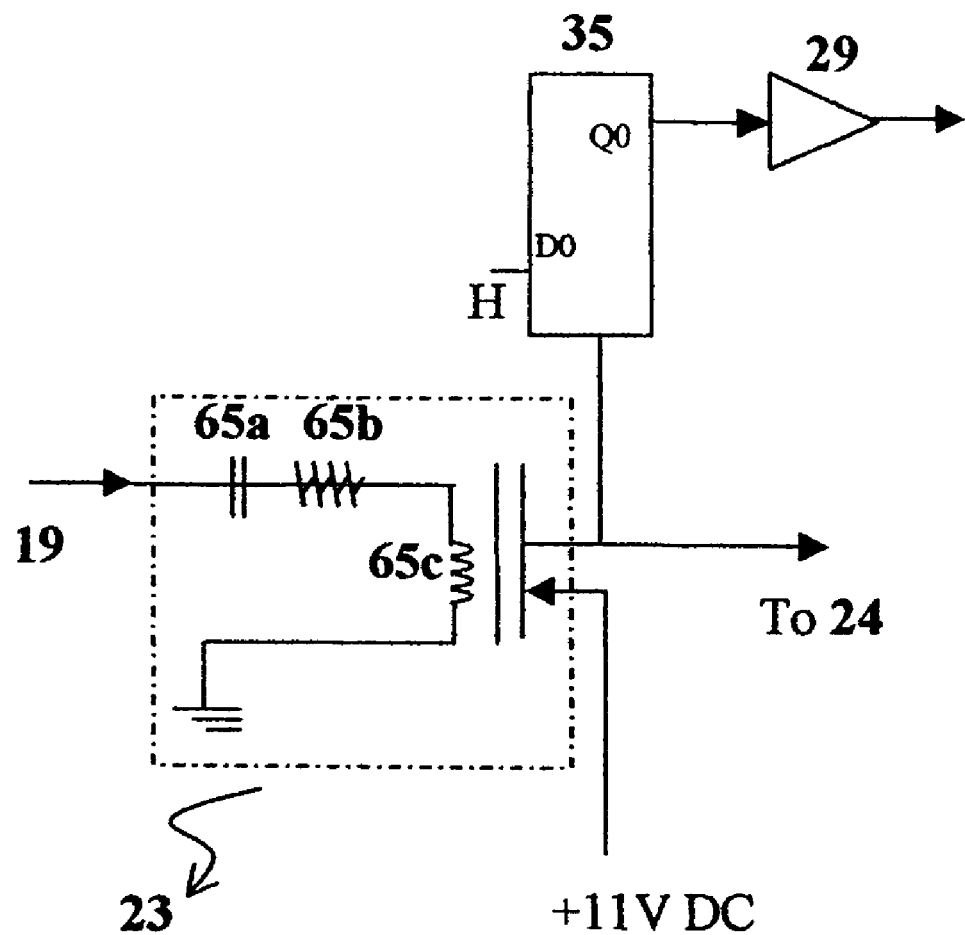
FIG. 3F Circuit diagram of a sequential relay unit, e.g., 23, shown in FIG. 3D.

The function of the RTG is to provide repeating ring tone AC signal to trigger the land-line telephone ringer to inform the receiving party of incoming calls through mobile phone, while voice AC is fed into wall jack. Signal of ring tone is a repeating 6 seconds cycle, 2 seconds are high voltage at 12V AC 17 and 4 seconds are +0 Volt or low voltage AC 16. Upon receiving the first cycle of ringer signal from mobile phone headphone outlet, the PMC unit will continue to provide the ring tone signal cycles, as shown in FIG. 3D, to land-line telephone through line A* until the receiving party answers the phone. To provide the correct cadence from the PMC box, the RTG module is composed of six shift registers 34–39, five relays 23–27, six amplifiers 28–33, and one clock generator 19. Resistor 20 and capacitor 21 are the coupling devices of clock signal generator 19. The six ring tone voltage amplifiers and shift registers will record and replay the preset tone voltage level which corresponds to the repeating 6 seconds interval. In any of the register, D0 represents the data input voltage and Q0 represents the output voltage. 34 and 35 are the high(H) input voltage level and 36–39 are the low(L) input voltage level of the 6 seconds cycle. Note that 17 represents the first two seconds of high voltage and 16 represents the last four seconds of low voltage in the 6 seconds cycle. Register voltage timing control is done by a relay 23, which consists of a capacitor 65a, a resistor 65b, and an inductor 65C, as shown in FIG. 3F, and a clock signal generator 19 shown in FIG. 3D. Mechanical relay 18 is the output control device from IVD, also shown in FIG. 3E. Relay 18 is normally ON (NO) and receives power supply from a ring tone connecting device 10, shown in FIG. 3D and detailed in FIG. 3G. With both 10 and 18 at ON position, power supply is then send to clock signal generator 19 and subsequently creates the 6 seconds high/low voltage cycles to trigger land-line ringer. Relay 18 is controlled by IVD through voltage output line 22 of the connecting device 10 to turn off the 11V DC supply to the clock generator 19, and subsequently turn off the sequential register circuitry as soon as the receiving party picks up the phone. See the time chart shown in FIG. 2D for the operating sequence of relay and ring tone control.

The duration of clock signal generated by 19 is 6 seconds per cycle. The first second is at high voltage level 40 and the next 5 seconds are at low voltage level 41. The first high voltage level signal will trigger register 34 and start to charge relay 23. Relay 23, with embedded RC time delay circuitry, will be triggered at the $2^{nd}$ second, and then relays 24–27 will be trigger sequentially in the next 4 seconds. Hence generates a 6 second voltage pulse cycle, shown as the 17 and 16 voltage cycle in FIG. 3D, to be send to the land-line telephone set.

Impedance Variation Detector; FIG. 3E

Figure 2C:
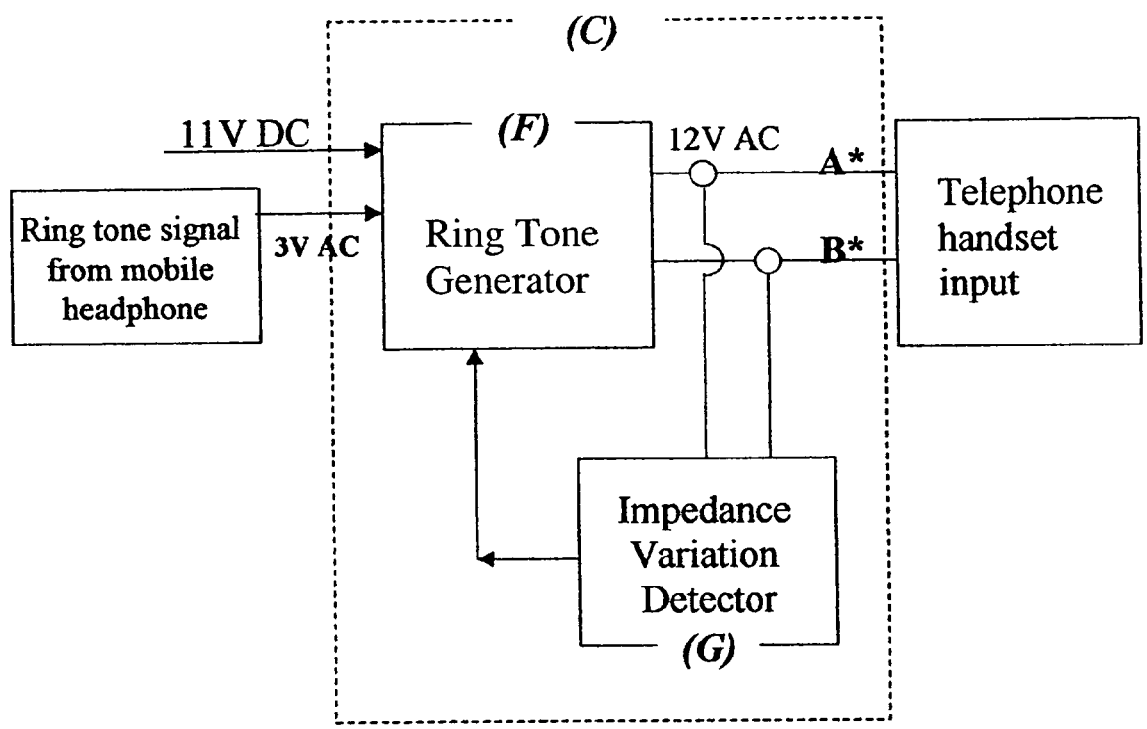
FIG. 2C Schematic diagram showing the ring tong circuit controller unit (C) in dashed functional block.

Function of this unit (G), shown in FIG. 2C, is for detecting the land-line telephone handset hook switch On/Off status and to control the RTG module (F) to keep on generating the tone signal until the handset is picked up by receiving party. The mechanism of the circuit is designed to detect the impedance variation before and after the handset switch-hook of the land-line house telephone set speech circuit is engaged and ready to receive the voice signal input from A* and B*, shown in FIG. 2C. Note that unit 61 of FIG. 3E is the RTG module (F) of FIG. 2C. Major components of this circuit include one high pass filter (consists of one resistor 45, one induction coil 46, and one capacitor 47), one Wheatstone bridge (consists of four resistors 53–56), a differential amplifier 59 and a mechanical relay 18 to control the RTG module. 42 represents the total resistance from the land-line telephone circuit. Terminals A* and B* in FIG. 3E are connected to the signal AC output of the PMC box, which is also connected to land-line telephone set. Capacitors 43 and 44 are used as the DC isolators. A high pass filter is used to attenuate any low frequency signal in the human voice domain. Two additional capacitors 49 and 51 were added to the circuit to remove high frequency noise signal. Two diodes 48 and 52 are used to regulate the current direction and make the parasitic AC voltage to positive. Then, the circuit was attached to one side of the Wheatstone bridge, in parallel with resistor 56. When the land-line telephone switch hook is depressed by telephone handset, the impedance seen by Wheatstone bridge will be the total impedance in the PMC circuit in serial with the ringer circuit of the land-line telephone unit. Power of the bridge is supplied by Vdd 57 from voltage driver. Once the receiving party picks up the land-line telephone handset, the total impedance will be shunt by the speech circuit resistance 42. The variation of the impedance will then be detected by the Wheatstone bridge. Since the Wheatstone bridge is also connected to the input of a differential amplifier 59 from the other side, the difference of the input voltage will be amplified from the output terminal of the differential Amp to drive the relay unit 18. Power for amplifier 59 is supplied by +Vcc 58 and −Vcc 62 from the 11V DC generated by the ring tone circuit voltage driver. The function of relay 18 shown in FIG. 3E is to turn off the power of RTG module as soon as variation of impedance is detected. 18 has one inductor unit 60a and three terminals, NO 60b, CO 60c, and NC 60d.

Relay Unit; FIG. 3F

The mechanism of the first relay unit 23, connecting to register 35 and then to amplifier 29 as shown in FIG. 3D, is explained next. A capacitor 65a and a resistor 65b are arranged in serial to create one second time delay before pulse charge up the induction coil 65c of the relay unit to trigger register 35. One second delay will provide sufficient time to space out the signal coming out from the register in 6 seconds interval shown in 16 and 17 of FIG. 3D. Then, the voltage pulse from amplifier 29, as part of the 6 seconds cycle, will be fed into the ringer circuit in the land-line telephone set.

Figure 3G:
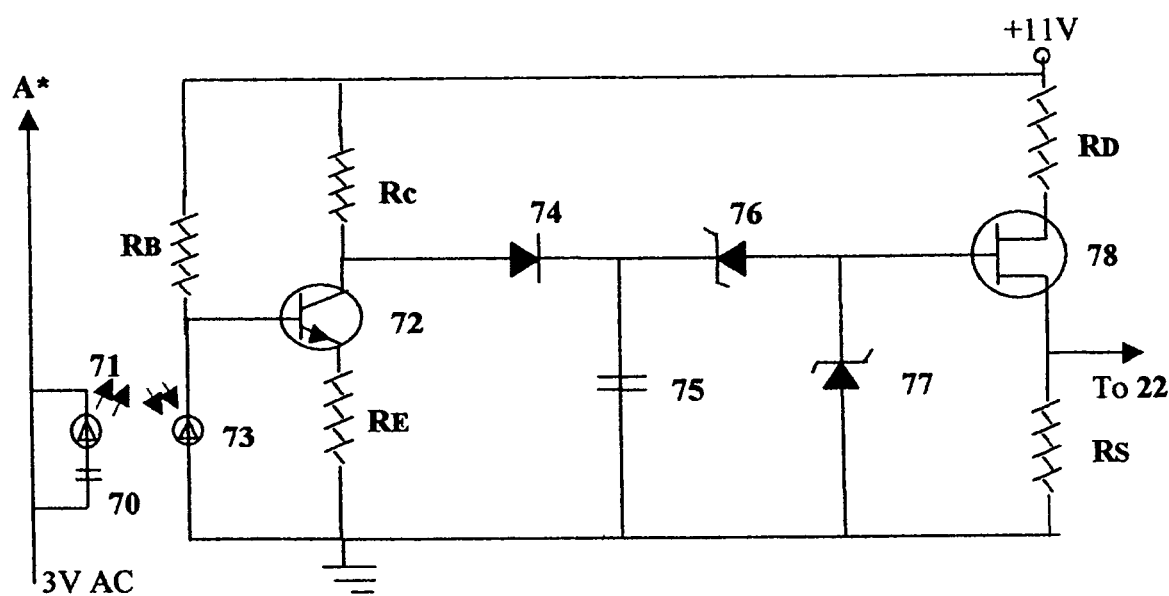
FIG. 3G Circuit diagram of a ring tone connecting device 10 shown in FIG. 3D.

Ring Tone Trigger Unit; FIG. 3G

This device uses the analog ring signal from mobile phone to trigger the voltage needed for clock generator 19 of FIG. 3D. Hence, the ring tone signal to the land-line telephone set. The unit is made up of a capacitor 70, a diode emitter 71, a transistor 72 and a diode receiver 73 to detect mobile phone ring signal and to eliminate low frequency analog signal. These devices will transfer the ring tone AC voltage to the next triggering circuitry without interfering with the ringer voltage sent out from the mobile phone. The output of transistor 73 equals the input AC signal. Diode 74 is used to regulate current direction. Zener diode 76 is the voltage limiting device and capacitor 75 is the AC high frequency filter. Both devices will maintain fixed voltage threshold and reduce the voltage ripples that feed into the MOSFET transistor 78. The Zener diode 77 will stabilize input voltage of MOSFET 78. Then, the transistor will be turned ON and allow 11V DC to trigger the clock signal generator 19 as shown in FIG. 3D.

$R_B$, $R_E$ and $R_C$ are the resistors used to maintain proper operating DC bias and electrical current (mA) flow for transistor 72. $R_D$ and $R_S$ are the voltage bias resistors to turn on the MOSFET 78.

We claim:

1. An apparatus for routing a mobile phone incoming call to a connected land-line telephone, the apparatus comprising:

an interface to connect with a headphone outlet of the mobile phone to receive ringer and voice AC signals from said mobile phone as input;

an RJ11 port arranged to be interfaced with a first cable, said first cable being arranged to be coupled to said land-line telephone in order to send a DC voltage sufficient to drive a ringer of said land-line telephone and to output an AC voltage for voice conversation;

an approximately 110V AC power plug arranged to be connected to an approximately 110V AC power supply that is arranged to provide sufficient power to operate said apparatus;

a power supply circuit to convert an approximately 110V AC power to an approximately 11V DC power;

a voltage driver circuit arranged to split the approximately 11V DC power into an approximately 8V DC power and an approximately 11V DC power;

a ring tone generator (RTG) arranged to be interfaced to the headphone outlet of the connected mobile phone which, upon receiving an incoming call, outputs an approximately 3V AC signal, the approximately 3V AC signal being arranged to generate a series of high-low voltage cycles to drive the ringer of said land-line telephone; and an impedance variation detector (IVD) arranged to, upon detecting a line resistance variation caused by lifting or hanging-up telephone handset from a hook of said land-line telephone, switch the approximately 11V DC power to said RTG to silence the ringer of said land-line telephone or to prepare for the approximately 3V AC signal that is arranged to drive the ringer of said land-line telephone, wherein said IVD comprises:

a high pass filter circuit that is configured to attenuate substantially low frequency signal in a human voice range, the high pass filter including at least one resistor, at least one induction coil, and at least one capacitor;

a capacitor arrangement arranged to remove high frequency background noise;

a diode arrangement arranged to regulate a current direction and to compensate for a parasitic AC voltage; and a differential amplifier arranged to drive a mechanical relay unit.

2. The apparatus recited in claim 1, wherein the RTG includes a clock generator and a circuit design, the circuit design being arranged to provide the approximately 11V DC power supply to the clock generator upon detecting the approximately 3V AC signal input from the connected mobile phone, the circuit design comprising:

a ring tone connecting device having an emitter diode and a receiver diode arranged to detect the approximately 3V AC signal input from said mobile phone;

a transistor arranged to compensate for a low frequency analog signal;

a diode arranged to regulate a current direction;

a high frequency filtering capacitor;

the mechanical relay having a default ON state, the mechanical relay being arranged between the IVD and the RTG, the mechanical relay including an inductor and approximately three terminals arranged to switch off the approximately 11VDC power supply when the IVD detects a line resistance variation of said land-line telephone; and a voltage stabilizing zener diode arrangement and a MOSFET transistor arranged to turn on a connection for the approximately 11V DC power through the mechanical relay to the clock generator.

* * * * *